No. 629,394. Patented July 25, 1899.
I. L. ROBERTS.
PROCESS OF REDUCING METALLIC COMPOUNDS AND PRODUCING METALLIC CARBIDS.
(Application filed May 26, 1896. Renewed May 18, 1899.)
(No Model.) 2 Sheets—Sheet 1.
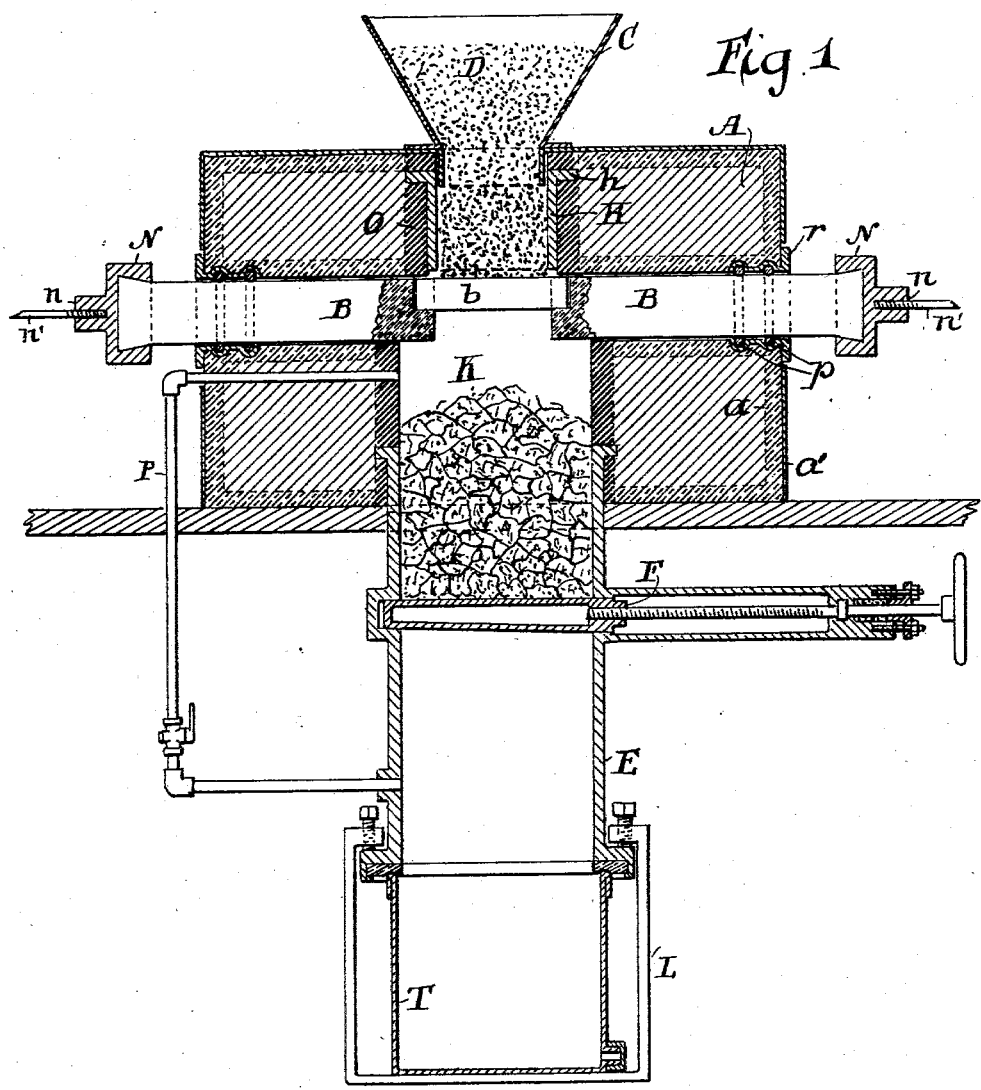

No. 629,394. Patented July 25, 1899.
I. L. ROBERTS.
PROCESS OF REDUCING METALLIC COMPOUNDS AND PRODUCING METALLIC CARBIDS.
(Application filed May 26, 1896. Renewed May 18, 1899.)
(No Model.) 2 Sheets—Sheet 2.
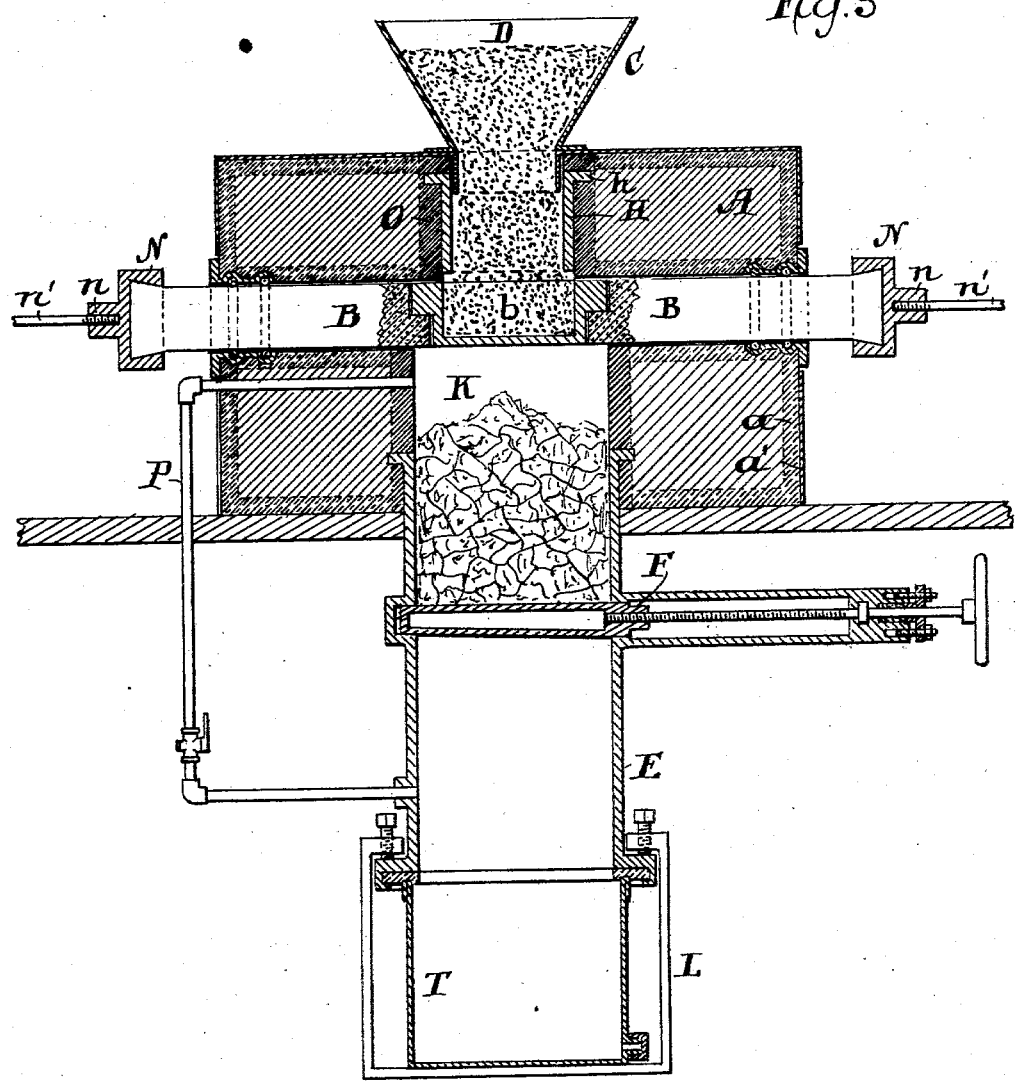
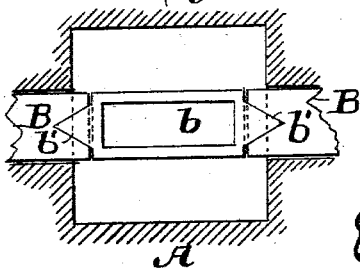

UNITED STATES PATENT OFFICE.

ISAIAH L. ROBERTS, OF NEW YORK, N. Y.

PROCESS OF REDUCING METALLIC COMPOUNDS AND PRODUCING METALLIC CARBIDS.

SPECIFICATION forming part of Letters Patent No. 629,394, dated July 25, 1899.

Application filed May 26, 1896. Renewed May 18, 1899. Serial No. 717,291. (No specimens.)

*To all whom it may concern:*

Be it known that I, ISAIAH L. ROBERTS, of the city of New York, (Brooklyn,) county of Kings, and State of New York, have invented a new and useful Process for the Reduction of Metallic Compounds and the Production of Metallic Carbids, of which the following is a full, true, and exact description, reference being had to the accompanying drawings.

This invention relates to a new and useful process (as ordinarily employed, a continuous process) for reducing metallic compounds by heating the same in the presence of carbon or converting the same into carbids by union with carbon. The process so employed operates by the cumulative heat of incandescence in a closed chamber, by means of which a temperature approximating to that of the arc can be obtained. The metal reduced or the carbid formed is then allowed to flow through the heated supports and is received in a vessel, from which it can be removed as desired.

Heretofore carbids have been made by heating oxids and carbon in the electric arc and some carbids by heating carbon and oxid with another metal in a furnace with ordinary heat. In my present method I produce carbids by placing a mixture of carbon and oxid in contact with a conductor of electricity which will stand a heat sufficiently high to cause the reduction of the oxid and the union of the metal and carbon. If the reducing metal will not combine with the carbon to form carbid, then the metal will be volatilized and condensed and obtained as such. I accomplish this result by the use of the apparatus shown in the accompanying drawings and by the process described in the following specification, in which—

Figure 1 represents a vertical cross-section of my apparatus; Fig. 2, a plan view of my incandescing grate-bars; Fig. 3, a vertical cross-section, corresponding to Fig. 1, of a modification of my apparatus; and Fig. 4, a plan view of the incandescing apparatus shown in Fig. 3.

Like letters of reference refer to like parts throughout my drawings.

A represents my furnace.

B B $b$ is a conductor.

C is a funnel.

D is a mixture of oxid and carbon.

E is a tube for carrying away the carbid.

F is a hollow gate-valve for letting out an accumulation of the solid carbid or metal when formed, which may drop into a receptacle, (shown at T.)

To construct and operate my furnace, I proceed as follows: I build a furnace of firebricks, except the inner course of brick, which is nearest the substance to be heated, and this I make of compressed magnesia O. Outside of the fire-brick I use a layer of slaked lime or calcined magnesia $a$ and a sheet-iron casing $a'$ over all, care being taken not to touch the conductor by the said casing. The inner lining of magnesia bricks will be sufficiently refractory for the heat necessary in the production of carbids, while the fire-brick will give strength, and an outer casing of floculent lime or magnesia will prevent loss of heat by radiation.

In constructing the furnace I build in the conductor B B $b$, which is made up of three parts. The parts which lead into the furnace are a part of the furnace-wall and are massive in comparison to the central portion $b$, which is made of bars or rods placed so near together that only a space of an eighth or a quarter of an inch is left between them or such space as will be necessary for retaining the unconverted materials. I may use a pan or vessel instead, as will be more fully explained hereinafter. Angular recesses $b'$ are made in the massive ends B B, in which the bars $b$ fit as snugly as possible and which latter can be removed when worn too much to be used. In order to make good connection between the ends of the bars $b$ and the leading-in conductors B B, I make use of a graphite paste made thin enough with only water and graphite to fill any space between the ends of the bars and the recesses which may exist by reason of the bars not fitting snugly, and I thus secure a good contact. I suspend a square carbon-chute H over the bars $b$ by resting it on the brickwork by the flange $h$, and on this I place a funnel of metal C for carrying the mixture of carbon and oxid D. The leading-in conductors have metal castings N N on their outer end over a shoulder, as shown in the drawings. The metal when cast around such a form shrinks thereon and makes a good contact therewith. A boss $n$ is cast on the casting, into which a copper conductor $n'$ is screwed. The leading-in conductors may pass through packings of asbestos or similar material $p\ p$. They are held in place by a bushing $r$, which does not come in contact with the surrounding metal covering of the furnace.

To operate the furnace and carry out my process of making carbids, I proceed as follows: I first place some small pieces of carbon or coal in the space between the bars to prevent the oxid and carbon mixture from falling through and then fill the chute H, through the funnel C, with a mixture of the metallic oxid desired to be treated and carbon in the proportions of their chemical equivalents for making the carbid, or, if I desire to produce metals, I use a mixture of carbon and the oxids or salts in the proportions necessary. I next pass a current of electricity through the conductor and bars or pan aforesaid in sufficient quantity to bring the bars or pan $b$ to a sufficient heat to cause the union of the carbon and metal as carbid by reduction of the oxid, and I further heat the carbid thus formed to its melting-point, when it will by gravity drop through the spaces in the bars $b$ and the pieces of small coal therein and fall down into the space K, where it will rest on the gate-valve F. Care should be taken to keep the chute H well filled with the mixture, so that no air can get into the chamber K, which will be filled with carbonic-oxid gas made from the decomposition of the oxid above the conductor-bars $b$. These gases may be led away through the pipe P and used for any purpose, one of which is the displacement of the air from the vessel T, which fits on the stirrup or frame L and which is filled with the carbid by the opening of the gate-valve F. The displacement of the air is necessary, as the hot metal or carbid and the aforesaid gas coming in contact with the air in the vessel would cause an explosion.

Figs. 3 and 4 show another form of conductor, wherein instead of bars $b$, as shown in Figs. 1 and 2, a pan $b$ may be employed for the incandescing part. As in the case of the bars, the pan has much less cross-section than the leading-in conductors, and therefore much more resistance, and will become incandescent, while the leading-in conductors do not become red-hot. This pan should be made of carbon if a heat is required for working carbid, but if only for the reduction of metals, such as sodium or zinc, then iron will do. In any case the resistance of the pan or bars and their contents should be much greater than the leading-in conductors. This form of furnace is most desirable for use in the reduction of volatile metals, such as zinc, sodium, potassium, and others. To make these metals, the exact mixture of carbon and oxids or salts of these metals should be made, so that when reduction is taking place continuously no excess of either oxid or carbon will remain in the pan. The metals will volatilize when reduced and hot enough and will condense in the lower part of the furnace and can be drawn out, as is the carbid, by opening the gate-valve F or, if molten, may be drawn out at a cock in the tube E. (Not shown.)

The carbonic oxid formed by reduction will escape through the tube P. If one or the other substance above named should become excessive in the pan, then a sufficient excess of the other should be added to the contents of the chute as will be necessary to produce an equilibrium.

What I claim as my invention, and desire to secure by Letters Patent, is—

The process of reducing metals or forming carbids thereof, which consists in supporting the mixture of the finely-divided metallic compound and carbon upon an incandescent conductor, or conductors, passing a current of electricity through said conductor or conductors, fusing said materials, preventing the passage of the unfused mass, and allowing the fused metal or carbid to continuously pass said conductor, substantially as specified.

In testimony whereof I have signed my name to this specification in the presence of two subscribing witnesses.

ISAIAH L. ROBERTS.

Witnesses:
H. COUTANT,
ANTHONY GREF.